United States Patent [19]

Criss

[11] Patent Number: 5,122,724
[45] Date of Patent: Jun. 16, 1992

[54] INRUSH CURRENT LIMITER

[75] Inventor: Loren O. Criss, Olympia, Wash.

[73] Assignee: The Boeing Company, Seattle, Wash.

[21] Appl. No.: 731,180

[22] Filed: Jul. 12, 1991

[51] Int. Cl.$^5$ .............................................. G05F 1/573
[52] U.S. Cl. .................................... 323/222; 323/282; 323/299; 323/908; 361/93; 361/111
[58] Field of Search ............... 323/222, 282, 299, 908; 361/93, 111

[56] References Cited

U.S. PATENT DOCUMENTS 4,678,984  7/1987  Henze ................................. 323/285
5,010,293  4/1991  Ellersick ......................... 323/908 X Primary Examiner—Steven L. Stephan
Assistant Examiner—Emanuel Todd Voeltz
Attorney, Agent, or Firm—Conrad O. Gardner; B. A. Donahue

[57] ABSTRACT

A circuit for limiting the inrush current in DC to DC and DC to AC power supplies. The circuit utilizes a small capacitor for taking a charge which slowly turns on a FET transistor placed in series with a large filter capacitor; the slowly reducing resistance of the transistor provides the desired inrush current limiting.

2 Claims, 1 Drawing Sheet

INRUSH CURRENT LIMITER

BACKGROUND OF THE INVENTION

1. Field of the Invention

The invention generally relates to electronic circuits for limiting the inrush current in DC to DC and DC to AC power supplies and more particularly to an inrush current limiting circuit for controlling inrush current surges resulting from LC filter configurations in DC to DC or DC to AC power supplies.

2. Background of the Invention

LC filters utilized in DC to DC and DC to AC power supplies inherently cause large inrush currents which are usually suppressed with dissipative components, adding to the cost and complexity of these power supplies.

Utilization of Field Effect Transistors (FET) in current limiting/regulating power supplies is well known in the prior art patent literature as exemplified by U.S. Pat. No. 4,814,687 to Walker in which a FET is placed in series between the voltage source and the load. Regulation/limiting is achieved by control electronics which vary the effective "on" resistance of the FET. Further exemplary of inrush current limiting circuits where a FET is utilized as the control transistor is U.S. Pat. No. 4,849,683 to Flolid. Also, inrush current limiting is further exemplified by U.S. Pat. No. 4,207,516 to Babcock.

SUMMARY OF THE INVENTION

It is therefore an object of the present invention to provide inrush current limiting through slow charging of large filter capacitors in electronic power supplies.

It is yet another object of the present invention to provide inrush current limiting in power supplies without suppression through utilization of dissipative components thereby adding to the cost and complexity of the power supply.

According to a preferred embodiment of invention, an inrush current limiting circuit is provided in which a small capacitor slowly turns on a FET transistor series connected with a large filter capacitor or capacitors in parallel thereby slowly reducing the resistance of the FET and affording the desired inrush current limiting.

BRIEF DESCRIPTION OF THE DRAWINGS

The foregoing and other objects, aspects, and advantages of the invention will be better understood from the following detailed description of the preferred embodiment of the invention with reference to the drawing FIG. 1 which is a schematic diagram of the inrush current limiting circuit.

DESCRIPTION OF THE PREFERRED EMBODIMENT

Figure 1:
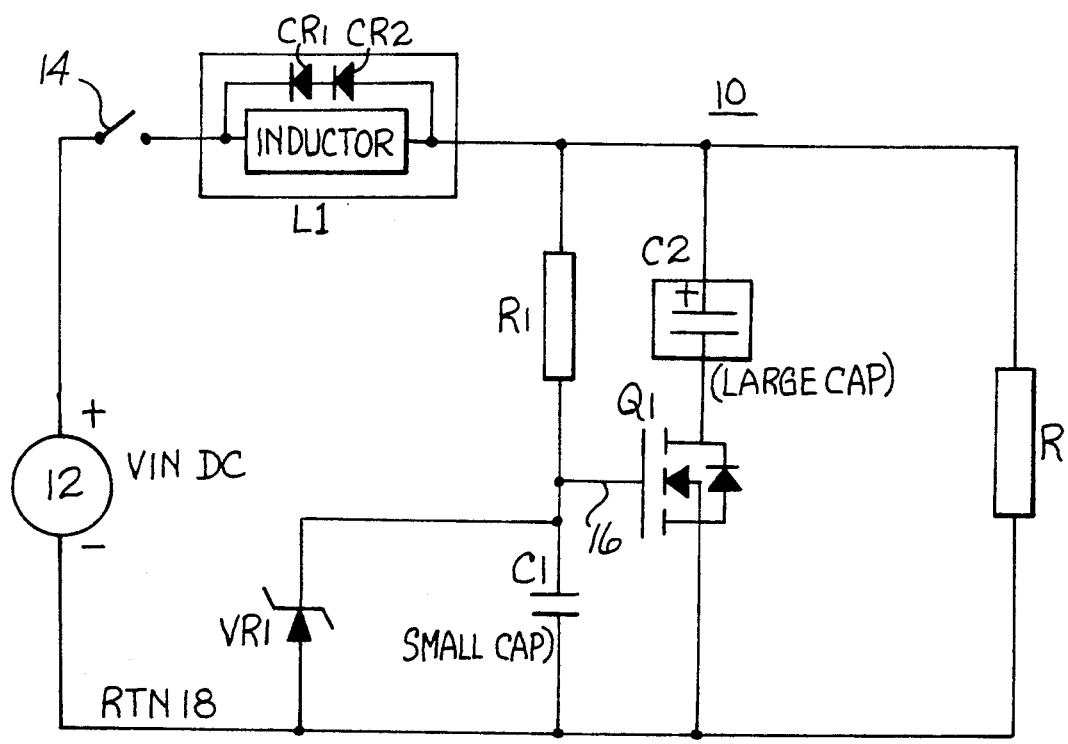

With reference to the drawing FIG. 1, there is shown an inrush current limiting circuit generally designated 10, for limiting inrush current through large filter capacitor C2 thereby enabling the circuit designer to freely choose any inductor L1 and filter capacitor C2 combination to meet the desired filter requirements. Inrush current limiting circuit 10 utilizes a small capacitor C1 for taking a charge which slowly turns on FET transistor Q1 series connected with large filter capacitor C2. The slowly reducing resistance of FET transistor Q1 provides the hereinbefore mentioned current limiting.

Operation of inrush current limiting circuit 10 is as follows: A DC voltage source (e.g. 28 volts) 12 is applied through closing of power supply switch 14. Capacitor C1 initially holds off transistor Q1. As capacitor C1 begins to charge, transistor Q1 slowly reduces its resistance to a small value termed "on resistance". This action limits the inrush current through large capacitor C2 to any level desired depending on the value of resistor R1 series connected with small capacitor C1 across the load R. R1 and C1 are physically small size components permitted by the present inrush current limiting circuit. Also the present design enables the circuit designer the flexibility of parallel connecting identical components with FET transistor Q1 to further reduce "on resistance" to meet filtering requirements. Inductor L1 may be any size inductance. Diodes CR1 and CR2 act as snubbers across inductor L1. A small zener diode VR1 is shown connected from gate 16 of FET transistor Q1 to ground return (common terminal 18) to protect gate 16 of FET transistor Q1 from an over voltage condition.

Representative values of the components of inrush current limiting circuit 10 are as follows:
- L1: 100uH (can be any value; designers choice)
- C1: 0.1uF to 1uF, for example
- C2: 1000uF (can be any value; designers choice)
- R1: 50k to 2M, for example
- Rload: 5 (can be any value; dictated by load requirements)
- CR1 1N6081 (can be any fast high current diode; designers choice)
- CR2: 1N6801 (can be any fast high current diode; designers choice)
- Q1: 1RFZ40 (can be any low Ron power mosfet; designers choice)
- VR1: 1N4702 or any similar 15V low current zener Note: The basic components of the present inrush current limiting circuit 10 are R1, C1, VR1, and Q1 (Q1 may be paralleled with additional same type power mosfets to further lower the on resistance). The other parts are all designers choice as to value and power handling capability.

What is claimed is:

1. In combination in a power supply having a power source connected across a load and wherein an inductor is series connected between said power source and said load and a capacitor is connected across said load, an inrush current limiting circuit, the improvement comprising:
    a FET transistor having a gate electrode, said FET transistor connected in series circuit with said capacitor;
    a series circuit including a further capacitor and a resistor connected across said load, said gate electrode connected between said resistor and said further capacitor; and,
    a zener diode connected across said further capacitor.

2. A power supply circuit having inrush current limiting comprising in combination:
    a power source;
    an inductor;
    a load;
    said power source series connected with said inductor across said load;
    a filter capacitor;
    a FET transistor having a gate electrode, said FET transistor connected in series circuit with said filter capacitor, said series circuit coupled across said load;
    an RC circuit connected in parallel with said series circuit; and,
    said gate electrode coupled to said RC circuit.

* * * * *